United States Patent [19]
Townsend

[11] 3,958,779
[45] May 25, 1976

[54] AIRCRAFT CONTROL SYSTEM WITH A JAM ISOLATING COUPLING

[75] Inventor: Richard E. Townsend, Huntington, N.Y.

[73] Assignee: Fairchild Industries Inc., Germantown, Md.

[22] Filed: May 27, 1975

[21] Appl. No.: 580,896

[52] U.S. Cl. .............................. 244/75 R; 74/471 R
[51] Int. Cl.² ......................................... B64C 13/42
[58] Field of Search .................. 244/83, 75 R, 77 V, 244/90, 60, 77 M; 64/11 R, 28 R; 74/471 R; 60/711

[56] References Cited
UNITED STATES PATENTS

| | | | |
|---|---|---|---|
| 2,307,556 | 1/1943 | Wileman | 64/28 R |
| 2,773,369 | 12/1956 | Klemm | 64/28 R |
| 2,793,503 | 5/1957 | Geyer | 60/711 |
| 2,869,385 | 1/1959 | Geyer | 244/75 R |
| 2,892,329 | 6/1959 | Trigilio | 64/28 R |
| 3,608,430 | 9/1971 | Headlund et al. | 244/75 R |

Primary Examiner—Trygve M. Blix
Assistant Examiner—Galen L. Barefoot
Attorney, Agent, or Firm—Michael W. York

[57] ABSTRACT

A control system including a jam isolating coupling for use in an aircraft including a plurality of related movable control members adapted to be moved in unison under normal operation conditions by appropriate separate and interconnected actuators. The related movable members are each provided with separate actuating shafts joined by a coupling which includes a sleeve which connects both shafts. Shearable rivets pass through suitable apertures in the sleeve and in one of the actuating shafts while the related actuating shaft is securely fastened to the sleeve by a plurality of bolts. The coupling structure is capable of accommodating any loads associated with the normal operation of the control system. However, when movement of a related control member is encumbered, the resistance to movement of the inoperable control member is opposed by the actuating forces applied through the operable actuating shaft of the related control member producing a high stress concentration on the shearable rivets causing them to shear and thereby disconnect the sleeve and its associated actuating shaft and isolate the encumbered control members from the related control member shaft.

10 Claims, 4 Drawing Figures

U.S. Patent May 25, 1976 3,958,779
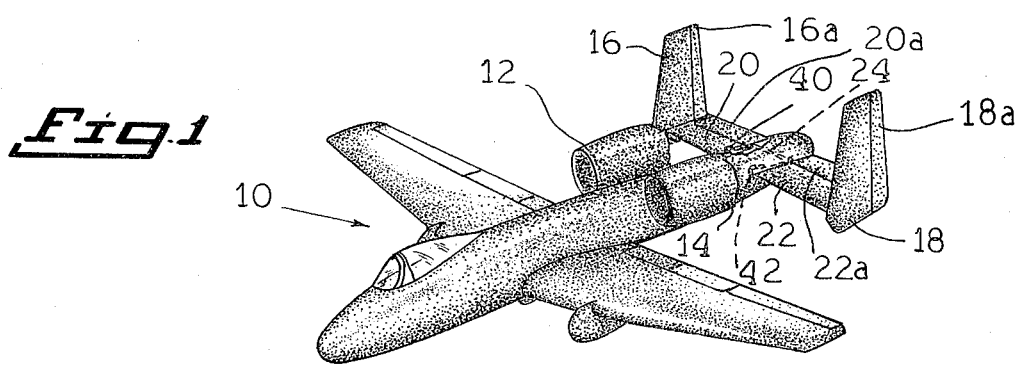
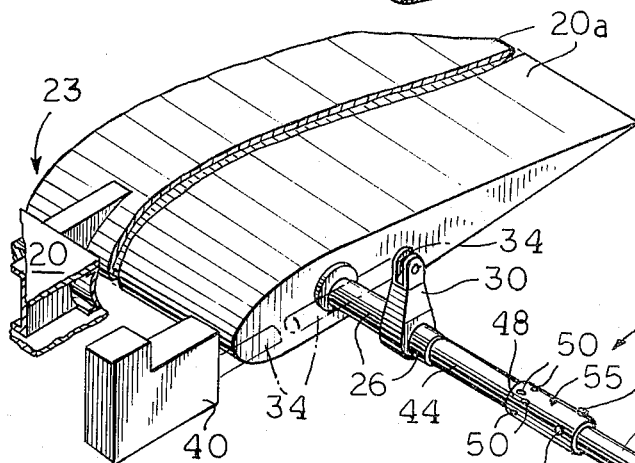
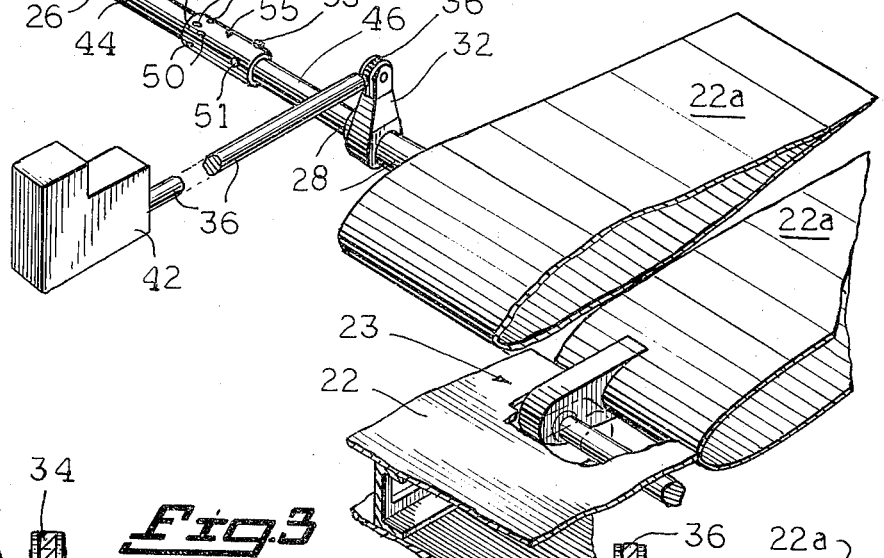
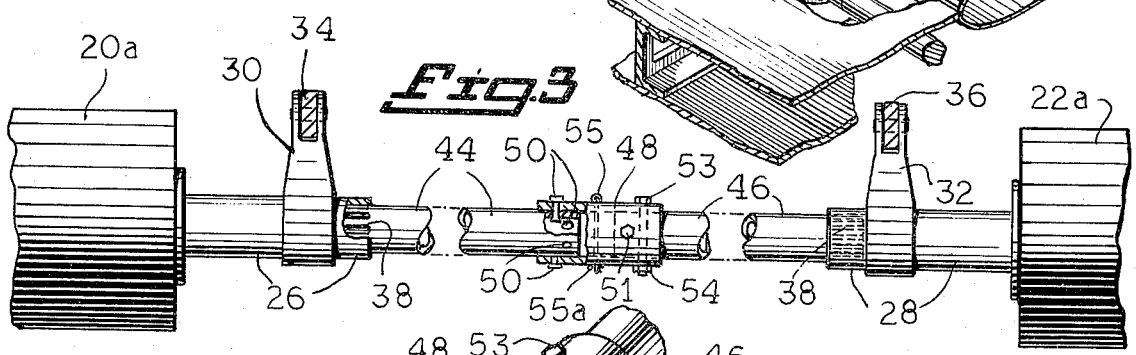
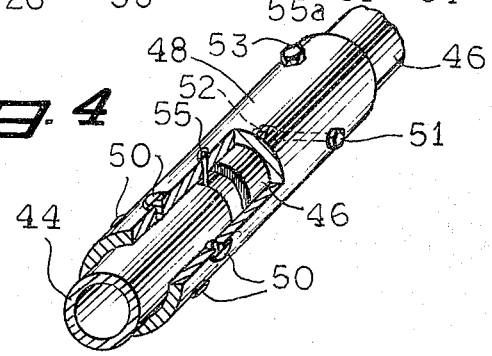

AIRCRAFT CONTROL SYSTEM WITH A JAM ISOLATING COUPLING

BACKGROUND OF THE INVENTION

Aircraft control systems incorporating redundant components have become increasingly popular with the passage of time as it becomes more evident that such redundancy contributes substantially to aircraft safety and reliability. A significant amount of development and evolution of such redundant systems and components in aircraft controls has occurred in connection with the design and fabrication of combat aircraft. This fact can readily be appreciated since obviously in this type of aircraft there is not only concern with reliability of the aircraft, but also with its survivability in the face of hostile action against the aircraft occurring at some time during the course of its service life. Coincident with this expectation is also the strong possibility that some damage to the aircraft is likely to occur. In this connection, those familiar with the aircraft arts are also aware of the fact that the intended mission of particular types of combat aircraft often dictate that certain compromises be made in aircraft design to better fulfill the intended mission performance of the particular aircraft, so that the extent of component redundancy, as well as the system complexity, can vary greatly between aircraft types. Notwithstanding this however, the use of the redundant component philosophy has generally been extended to more and more components and systems in aircraft, even to the point where triple and quad redundancy in certain critical areas are no longer unusual so that the survivability and reliability of such aircraft operating in a hostile environment has been considerably enhanced.

Along with the developing complexity and sophistication of redundant aircraft control systems, the number of attendant disadvantages have also proliferated. Among the more obvious of these are the increased costs of manufacture and maintainability that are inherently associated with the elaborate arrangements that have been devised, as well as the sometimes severe weight penalties upon the aircraft, which naturally have a deleterious effect on the performance capabilities of the aircraft. The trends toward increased complexity and sophistication, as well as the measures undertaken to cope with the attendant disadvantages, can be observed as some of the more relevant prior art is noted and discussed.

An indication of the earlier and more primitive attempts at utilizing the redundant philosophy to cope with what may be termed as artificial malfunctions of aircraft control systems caused by such hazards as a student pilot "freezing" at the controls, is disclosed in U.S. Pat. Nos. 1,817,204 and 1,332,345 which disclose variations of aircraft dual control systems which incorporate clutches or similar engageable means that are sensitive to control system jams and permit continued operation of the aircraft control system in the event that the system would otherwise be rendered inoperable.

The U.S. Pat. No. 2,793,503 to Geyer presents a more sophisticated approach and discloses an aircraft pivotal tail assembly having two movable members, each one adapted to be operated by a separate actuator through the use of a roller clutch mechanism. In this disclosure a separate synchronizing mechanism is in communication with each of the respective actuators to effect synchronous operation of the actuators and provide an auxiliary input signal to either of the actuators in the event that the fluid pressure to either actuator is interrupted.

U.S. Pat. No. 3,618,419 perhaps typifies some of the complexity found in a more modern aircraft control system utilizing redundant components and includes a gain control device. In the arrangements disclosed in this patent, a dual input actuator signal is introduced to the gain control device and a single output signal is generated which may be utilized to affect the position of a control member. In this device a comparatively complex whiffletree assembly transmits an output signal under normal operating conditions that is proportional to the sum of the two inputs. In the event of an input failure, a shift means is provided in the linkage to connect the whiffletree and the output to a normally disengaged input to increase the gain of the remaining input signal in order to obtain sufficient signal authority to satisfy the requirements of the system. A disconnect device that is sensitive to a jam failure is also provided to prevent or lock the whiffletree assembly against pivotal movement, and thereby permit the output member to be displaced.

It is helpful to note that the entire body of prior art is principally directed to the utilization of redundant and back-up means to preserve the control authority and signal to the aircraft's movable control members. In other words, the thrust of the prior art development has been directed toward the goal of permitting the continued actuation of the aircraft's movable control members to assure an increased degree of reliability. None of the known prior art appears to contemplate situations where damage to the aircraft's structure or a movable control member could encumber the continued operation of related control members and jeopardize the continued operation of the aircraft.

Accordingly, the present invention provides alternate means for improving the reliability and survivability of an aircraft in the event that a movable control member is incapacitated and may be readily incorporated in a wide variety of aircraft control systems without regard to the extent of component redundancy. The present invention can be introduced into existing systems and will function to complement the reliability and survivability of all such systems with minimal additional weight penalties and virtually no additional disadvantages while adding considerable additional dimension to the aircraft's ability to continue to function after experiencing damage or a malfunction.

SUMMARY OF THE INVENTION

This invention relates to aircraft control systems and more particularly to such systems that are equipped with provisions for handling the malfunctions of the system.

It is, accordingly, an object of the present invention to improve the reliability and survivability of an aircraft in the event that it sustains damage or undergoes a malfunction which encumbers the movement of a control member during the course of its operation.

It is also an object of the present invention to provide a control system whereby an inoperable member of an aircraft's control system will automatically become disassociated from related control members in the event of a disablement.

It is an object of the present invention to provide a control system whereby the actuating forces which implement the control authority to an inoperable control member will be automatically transmitted to a related operable control member not otherwise operable by normal actuating means.

It is another object of the present invention to provide a simple and dependable control system for permitting the continued unencumbered operation of an operable control member after a related control member is disabled.

It is an additional object of the present invention to provide a control system including a jam isolating coupling for movable aircraft control members which can be universally applied and readily incorporated into existing control systems having a plurality of movable members.

It is also an object of the present invention to provide a control system which includes a jam isolating coupling which can be simply, quickly and inexpensively restored after service and which will not require maintenance during the course of its service life.

It is another object of the present invention to provide a control system including a jam isolating coupling that is essentially unloaded during normal operation of the control system and therefore not subjected to strain until such time as a malfunction in the system might occur.

It is still another object of the present invention to provide a control system including a jam isolating coupling which has substantial torsional rigidity and strength to accommodate minor differential motions between the control members without inducing fatigue damage in the coupling.

The present invention provides a control system which includes a jam isolating coupling having a plurality of related movable control members adapted to be moved in unison under normal operating conditions by separate and operatively associated actuating means. The movable control members are each provided with separate actuating shafts joined by a concentric sleeve fastened to at least one shaft by a plurality of severable cylindrical fasteners which are adapted to yield in the event that one of the related movable members is incapacitated, thereby disconnecting the disabled member from the operable control member to permit its continued unencumbered operation.

BRIEF DESCRIPTION OF THE DRAWINGS

The invention will be hereinafter more fully described with reference to the accompanying drawings in which:

FIG. 1 is a perspective view of a typical aircraft having a plurality or related movable control members and incorporating redundant actuating means for said movable control members;

FIG. 2 is an enlarged perspective view of a portion of the structure illustrated in FIG. 1 showing the control system of the present invention and schematic representations of the redundant actuating means for said movable control members;

FIG. 3 is a front elevation of portions of the structure illustrated in FIG. 2 showing the coupling which forms part of the present invention partially in section operatively connecting the actuating shafts of each of the related movable control members; and FIG. 4 is an enlarged perspective view of the jam isolating coupling illustrated in FIGS. 2 and 3, which forms a part of the present invention.

DETAILED DESCRIPTION OF THE PREFERRED EMBODIMENTS

If reference is made to FIG. 1 in the drawings, a typical aircraft especially configured to provide an exceptionally high level of reliability and survivability has been illustrated and designated by the reference numeral 10. Some of the more noteworthy characteristics contributing to this particular configuration's superiority in this regard are apparent in this figure. As an example, the spatial separation and positioning of main critical components, such as the engine enclosed in nacelles 12 and 14, the vertical fins 16 and 18, and their associated rudders 16a and 18a, the horizontal stabilizers 20 and 22 and their associated elevator members 20a and 22a, coupled with redundant actuation systems (not shown) that may be operatively associated with these as well as other components, collectively operate to substantially reduce the aircraft's vulnerability to damage that might be inflicted upon it as a result of hostile action.

In addition to these more apparent features, many others incorporated within the aircraft's systems and components, as indicated above, can cooperate to provide an aircraft with a remarkably hardened resistance to crippling damage. However, in spite of an aircraft's purposeful design sophistication, ruggedness of construction and redundance of its critical components and systems, provisions must be incorporated to assure that unoperable or damaged components do not interfere with the operation of related systems or components and the like. This is, of course, particularly important in the case of related control members 20a and 22a that are movable under ordinary circumstances in unison relative to the horizontal stabilizers for even with back-up actuating systems and the like, in the final analysis the abilty of a damaged and inoperative control member to encumber related mechanisms can jeopardize the continued operation of the aircraft.

Accordingly, attempts to cope with such problems in the prior art which usually entailed the use of actuating signal bypasses, slip clutches and the like, with all of the associated disadvantages pertaining to them, could, despite all of the elaboratives of such systems, still not operate to minimize the risks of such a failure.

In the present invention, and as best illustrated in FIG. 2 of the drawings, the movable control members 20a and 22a are hinged in customary fashion to the horizontal stabilizers 20 and 22 by the hinge assemblies 23, part of which is shown, and are connected by a cross shaft assembly that has been generally designated by the reference numeral 24. This assembly includes quill shafts 26 and 28 which are fixed to their respective movable control members 20a and 22a in any well known fashion (not shown). Each of the quill shafts extend horizontally from their respective control members in a direction toward one another. The quill shafts 26 and 28 each support a bifurcated member 30 and 32, commonly and hereinafter referred to as control horns, which are substantially similar to one another in the present configuration and secured to the outer surface of each of the shafts 26 and 28, respectively. Each of the bifurcated control horns 30 and 32 is operatively connected to a control rod 34 and 36, respectively, which extend from a pair of actuators 40 and 42, respectively, which may be of any known variety; i.e., hydraulic, pneumatic or electrical, depending on the particular aircraft system.

Each of the aforementioned quill shafts 26 and 28 are provided with an internal spline 38, which is best seen in FIG. 3 of the drawings, and which extends for a limited distance from the end of each quill shaft in a direction toward the control member with which it is associated. The splines are adapted to receive and cooperate with a mating spline provided on the peripheral and surface of a pair of elongated shaft members 44 and 46, which are complementary to each of the quill shafts 26 and 28 and extend in a substantially horizontal direction. These shaft members 44 and 46 are situated in juxtaposition to one another and are contained within a concentric sleeve member 48 that is adapted to connect the shaft members 44 and 46 in the vicinity of their nearest proximity to one another. In the present configuration, the location of the sleeve connection coincides wih the approximate mid point between the movable control members 20a and 22a. As a result of this construction, the cross shaft assembly 24 ties the spaced movable control members together so that both members can move as a unit while at the same time accommodating slight misalignments between the control members with a structure that provides substantial rigidity and a minimal amount of torsional free play.

The aforementioned sleeve 48 may be manufactured of a relatively hard material such as steel or alloy and serves to couple the shafts 44 and 46 as well as to facilitate the mounting of a plurality of identical shearable fasteners 50. These fasteners, which hereinafter will be referred to as rivets, are made from a softer material such as an appropriate aluminum alloy and pass through suitable apertures provided in the sleeve, as well as corresponding apertures provided for each of the rivets at the end portion of one of the shafts, in this instance the shaft 44, as best seen in FIG. 3 of the drawings. The plurality of shearable rivets 50 are disposed in a radial direction in the shaft and sleeve and are situated in two spaced rows in accordance with customary rivet fastening and spacing practices. As can be seen in the drawings, and in particular in FIGS. 3 and 4, the shaft 46 is fastened to the sleeve 48 with a pair of bolt and nut combinations 51/52 and 53/54 which are accommodated in suitable apertures provided for the passage of the bolts in the shaft 46 and the sleeve 48.

A pin 55 is also provided in the sleeve 48 and is held in place by any suitable means such as the cotter pin 55a as shown in FIG. 3. The pin extends through the sleeve at a point near but not in contact with the extremities of each of the shafts 44 and 46. This pin prevents the complete disassociation of the cross shaft components in the event of a malfunction as will become apparent during the course of the forthcoming description of the operation of the present invention.

In accordance with the teachings of this invention, the above described structure comprising the cross shaft assembly 24, including the coupling, joins the movable control members 20a and 22a and is adequately sized and constructed with a suitable number of shearable rivets to furnish sufficient torsional rigidity so that it will safely accommodate all of the forces, including the customary safety factor that would be normally imposed upon the structure throughout the aircraft's operational envelope. Well-known design and stress calculation techniques are utilized in making this determination and in the interest of brevity will not be further elaborated upon herein. However, it should be appreciated that in redundant control systems such as that shown and described in the present arrangement, each of the related control members is operable by individual actuating means. Consequently, the coupling between the shafts will, during normal operation, only be subjected to the nominal loads that may be the result of slight variations in motion between the components of the related control members so that there is virtually no wear or possibility of fatigue experience by the coupling or any of its components.

In the present arrangements, the redundant actuators 40 and 42 are adapted to jointly operate in the same direction to effect movement of the control members 20a and 22a in the following manner. Energization of the actuators 40 and 42 will provide a push or pull force to the respective control rods 34 and 36, which will be transmitted to the control horns 30 and 32 fastened to the respective quill shafts 26 and 28 and thereby to the control members 20a and 22a, causing the control members to be moved about the hinge connection 23 to the stabilizers 20 and 22 in response to the actuating force. It should be pointed out that in such redundant actuating systems it is customary for each actuator to have the independent capability and sufficient power to operate the related movable control members 20a and 22a without assistance from the other actuator. In this manner, if one actuator or any of its related components were to experience a failure or malfunction, the remaining actuator can be depended upon for continued and uninterrupted service to provide the actuating force necessary to effect movement of its associated components.

According to the present invention, if some form of damage or a malfunction is sustained by the aircraft and produces a jam that prevents movement of one of the related control members 20a or 22a, as for example damage to the control member 22a or adjacent structures which interfere with its movability and render it inoperable, the resistance would of course be reflected through the associated quill shaft 28 and its related shaft member 46 to the coupling in the cross shaft assembly. As was previously mentioned, in the present configuration, during the course of normal operations, there is little or no load applied to the coupling between the shafts 44 and 46. However, as continuing actuating forces are exerted to move the control members, the inability of the damage affected control member 22a to respond is transmitted to the coupling through the nut and bolt connection which which locks the shaft 46 to the coupling sleeve 48, in opposition to the actuating forces exerted upon the upper portions of the rivets 50 by the actuating torque being applied to the sleeve 48. The resultant highly concentrated force differential will rapidly exceed the stress capability of the rivets 50 resulting in a simultaneous shearing of the rivets 50 by the hardened sleeve 48 thereby severing the connection with the shaft 44 to permit the unencumbered operation of the movable control member 20a. The aforementioned pin 55 prevents the lateral separation of any of the disconnected components when the coupling connection between the shafts has been severed. Since the sleeve 48 will no longer connect the control members and only one will operate, the resultant control imbalance may produce momentary effects on the aircraft, which can usually be readily overcome and compensated for by trim and power setting changes. Consequently, aircraft equipped with the present invention can survive damage inflicted upon it which could otherwise be disastrous. Accordingly, an aircraft which has sustained what ordinarily would be a critical failure can be safely returned to service after appropriate repairs to the damaged area and the simple and inexpensive restoration of new rivets 50 to the coupling sleeve 48 and shaft 44 have been completed.

It should be understood that, since the coupling is sensitive to differential torque between the related shafts as described above, the coupling will operate in the same manner when either of the related control members experiences a malfunction. In other words, the rivets 50 will shear in the manner described whether it is the control member 22a or 20a that is incapable of movement. As a consequence, the operation of the coupling of the present invention in the event of a malfunction in a related control member is automatic and will instantly satisfy emergency requirements to transfer torque to the remaining operable control member while isolating the malfunctioning member from the control system.

Although the invention has been described with reference to certain preferred embodiments, it will be understood that variations and modifications may be made within the spirit and scope of the invention as defined in the appended claims.

What is claimed is:

1. A control system for aircraft including aircraft structure, comprising in combination, at least two movable control members operatively connected to said aircraft structure, actuating means disposed on said aircraft and operably connected to each of said movable control members, means connecting said control members for permitting operation of one control member when the other is inoperable, said means including shear means shearable when one of said control members is immovable.

2. The control system of claim 1 wherein the means for connecting said control members includes a coupling situated between said control members, the coupling having shear means connecting said coupling with at least one of said movable control members.

3. The control system of claim 2 wherein the actuating means includes a shaft connected to each of said movable control members said coupling being operatively connected to said shafts, the shear means being disposed in said coupling and at least one of said shafts and adapted to shear when subjected to a torque differential between said coupling and said shaft.

4. The control system of claim 3 wherein said coupling is substantially concentric to said shafts and adapted to engage a portion of one end of each of said shafts which lie in proximity to one another.

5. The control system of claim 4 wherein the shear means is adapted to shear at the point of contact between said coupling and said shaft.

6. The control system of claim 5 wherein each of said shafts is operatively connected with separate actuating means.

7. The control system of claim 6 wherein one end of each shaft is splined and each movable control member has complementary splines engageable with the splined portion of the adjacent shaft.

8. The control system of claim 7 wherein said control member shafts and said coupling are normally movable about a substantially common axis.

9. The control system of claim 8 wherein the shear means include replaceable members for restoring the operative connection between said shaft and said coupling.

10. The control system of claim 8 wherein a pin is disposed in said coupling between said shafts to limit axial translation of said shafts when the coupling connection between said shafts has been severed.

* * * * *